United States Patent [19]
Hadley

[11] Patent Number: 5,070,410
[45] Date of Patent: Dec. 3, 1991

[54] APPARATUS AND METHOD USING A COMBINED READ/WRITE HEAD FOR PROCESSING AND STORING READ SIGNALS AND FOR PROVIDING FIRING SIGNALS TO THERMALLY ACTUATED INK EJECTION ELEMENTS

[75] Inventor: LeMoyne F. Hadley, Corwallis, Oreg.

[73] Assignee: Hewlett-Packard Company, Palo Alto, Calif.

[21] Appl. No.: 327,481

[22] Filed: Mar. 21, 1989

[51] Int. Cl.$^5$ .................... H04N 1/034; G01D 15/16; B41J 2/05

[52] U.S. Cl. ............................... 358/296; 346/140 R; 358/472

[58] Field of Search ............... 358/296, 401, 472, 476, 358/497; 346/140 R; 400/126

[56] References Cited

U.S. PATENT DOCUMENTS

| | | |
|---|---|---|
| 3,272,918 | 9/1966 | Koll et al. |
| 3,560,641 | 2/1971 | Taylor et al. |
| 3,800,076 | 3/1974 | Koizumi |
| 4,069,486 | 1/1978 | Fox |
| 4,106,061 | 8/1978 | Burnett |
| 4,112,469 | 9/1978 | Paranjpe et al. |
| 4,266,250 | 5/1981 | Heinzl et al. |
| 4,296,421 | 10/1981 | Hara ................. 346/140 R |
| 4,302,782 | 11/1981 | Gunning et al. |
| 4,321,627 | 3/1982 | Hooker, III et al. |
| 4,475,130 | 10/1984 | Miller et al. |
| 4,490,728 | 12/1984 | Vaught et al. |
| 4,494,128 | 1/1985 | Vaught |
| 4,496,984 | 1/1985 | Stoffel |
| 4,499,479 | 2/1985 | Lee et al. |
| 4,500,895 | 2/1985 | Buck et al. |
| 4,539,568 | 9/1985 | Lewis et al. |
| 4,580,149 | 4/1986 | Domoto et al. |
| 4,649,437 | 3/1987 | Watanabe |
| 4,651,229 | 3/1987 | Coli |
| 4,683,501 | 7/1987 | Carena et al. |
| 4,706,128 | 11/1987 | Tanioka et al. |
| 4,755,877 | 7/1988 | Vollert |
| 4,794,463 | 12/1988 | Tamura ..................... 346/140 R |
| 4,823,195 | 4/1989 | Ito ........................... 358/296 |
| 4,839,741 | 6/1989 | Wilson |

Primary Examiner—Benjamine R. Fuller
Assistant Examiner—Scott A. Rogers

[57] ABSTRACT

A reproducing system uses an array of photodetector elements to sense an image from an original document page and a corresponding array of printing elements to print the image onto a duplicate document page. Mirror-imaging between the original and duplicate documents is avoided by electrical or mechanical elements that couple the photodetector and printing arrays.

6 Claims, 4 Drawing Sheets

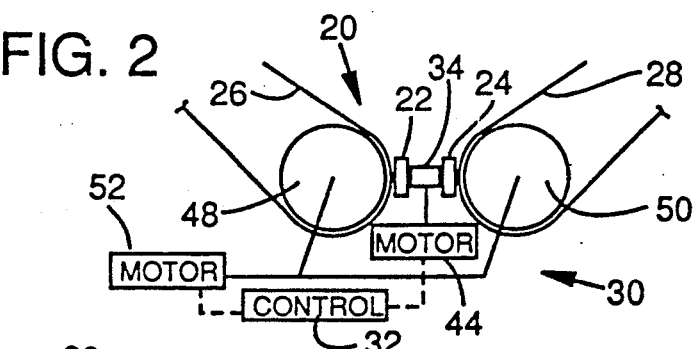
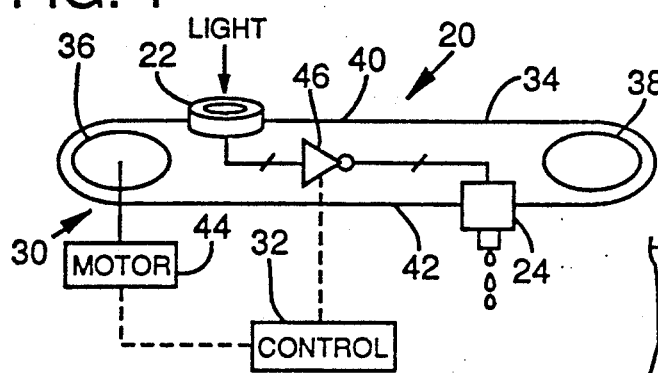
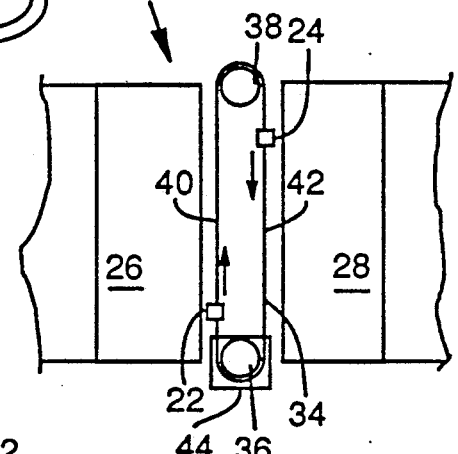
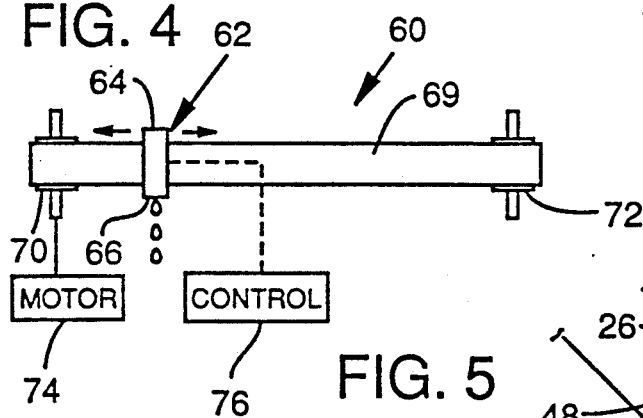
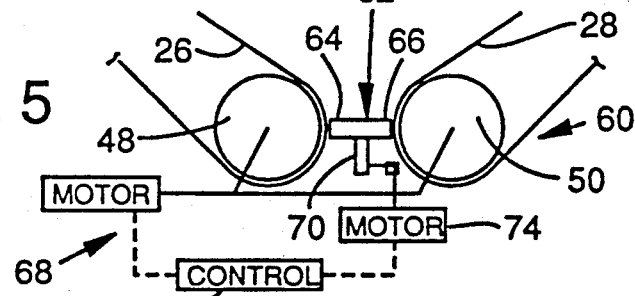
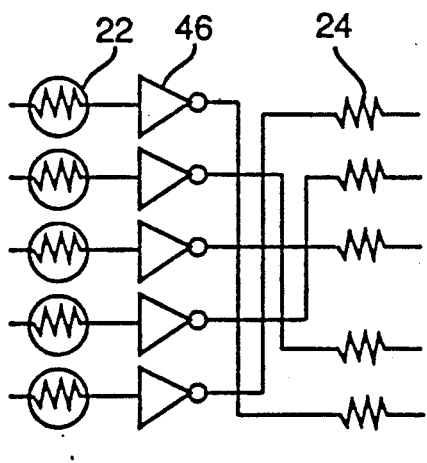
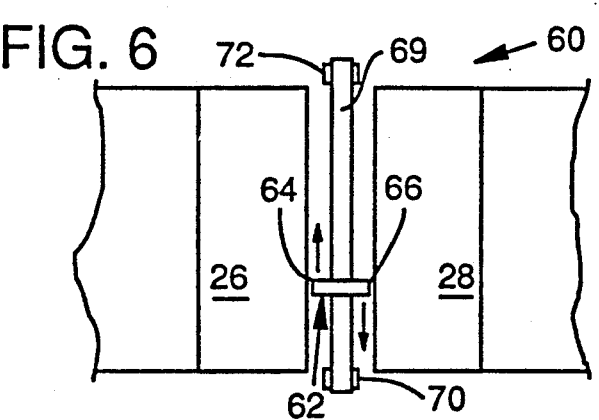

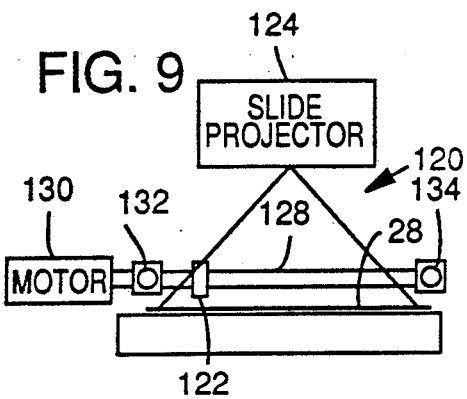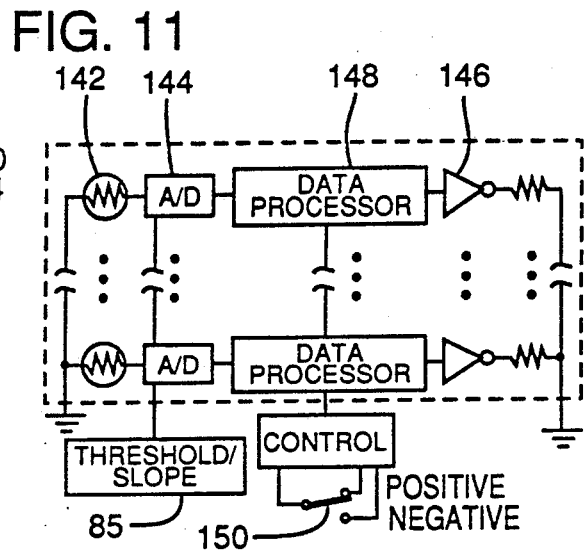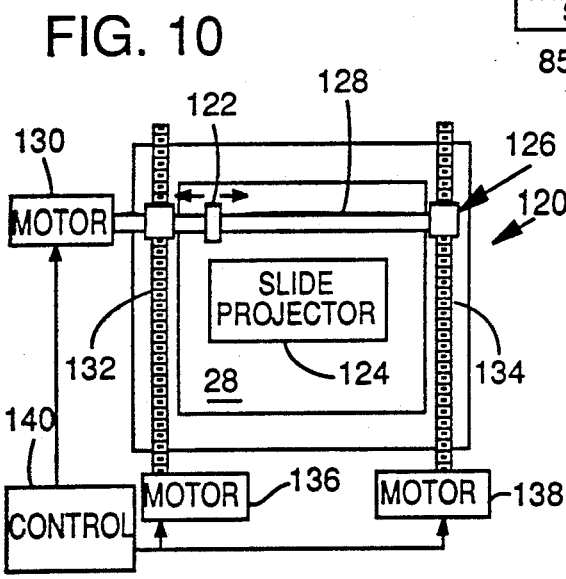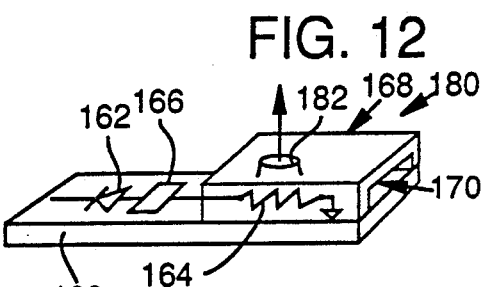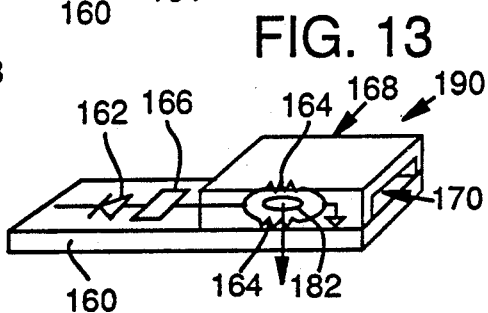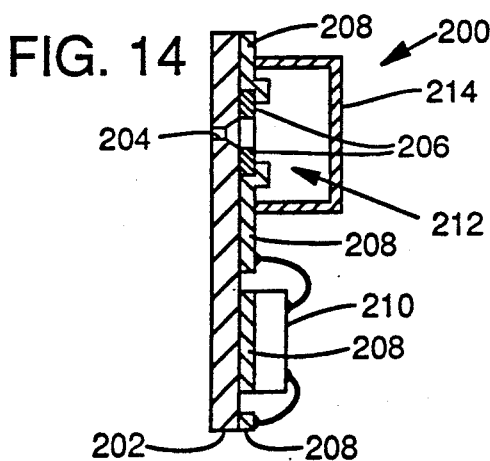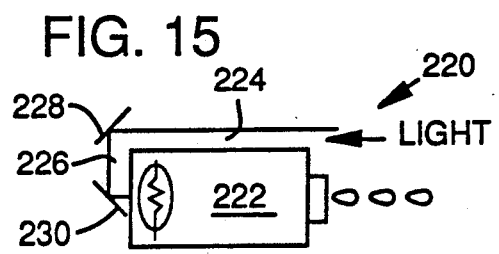

APPARATUS AND METHOD USING A COMBINED READ/WRITE HEAD FOR PROCESSING AND STORING READ SIGNALS AND FOR PROVIDING FIRING SIGNALS TO THERMALLY ACTUATED INK EJECTION ELEMENTS

FIELD OF THE INVENTION

The present invention relates to duplicating systems, and more particularly to such systems wherein an image is sensed by an array of photosensors and reproduced using a corresponding array of printing elements.

BACKGROUND AND SUMMARY OF THE INVENTION

Modern technology has produced a wide variety of image reproduction techniques. One which has become increasingly popular is reproduction by an ink jet printer of an image derived by scanning a document.

In one class of such systems, exemplified by U.S. Pat. Nos. 4,112,469 and 4,321,627, the scanning of the document is achieved by an oscillating mirror that reflects light from the original document onto a stationary array of photodetectors. The resulting data is then provided to an ink jet array that reciprocally traverses a duplicate page mounted on an advancing drum and prints the image.

In another class of such systems, exemplified by U.S. Pat. No. 4,496,984, the original and duplicate pages are moved simultaneously past half page-width arrays of photodetectors and ink jets, which scan the original and print the duplicate, respectively.

U.S. Pat. No. 4,266,250 discloses an apparatus useful as the scanning/printing mechanism in a facsimile machine or the like wherein an array of photodetector elements is mounted adjacent an ink jet printing head on a reciprocating carriage. Depending on the mode of operation selected, either the scanning or printing elements can be utilized.

While numerous such systems are known in the art, all have certain disadvantages. Many are disadvantageous by reason of cost and complexity. Those that are simple often yield duplicates that are mirror-images of the original. Accordingly, there remains a need for improved reproducing apparatuses, particularly apparatuses that are of simple and inexpensive construction, yet that provide duplicates that are not mirror-images of the originals.

According to the present invention, a reproducing system uses an array of photodetector elements to sense an image from an original document page and a corresponding array of printing elements to print the image onto a duplicate document page. Mirror-imaging between the original and duplicate documents is avoided by electrical or mechanical elements that couple the photodetector and printing arrays.

The foregoing and additional features and advantages of the present invention will be more readily apparent from the following description thereof, which proceeds with reference to the accompanying drawings.

BRIEF DESCRIPTION OF THE DRAWINGS

FIG. 1 is a schematic illustration of a reproducing apparatus according to the present invention.
FIG. 2 is an end view of the apparatus of FIG. 1.
FIG. 3 is a top view of the apparatus of FIG. 1.
FIG. 4 is a schematic illustration of a reproducing apparatus according to another embodiment of the present invention.
FIG. 5 is an end view of the apparatus of FIG. 4.
FIG. 6 is a top view of the apparatus of FIG. 4.
FIG. 9 is a side view of a reproducing apparatus useful to obtain hard copy output corresponding to transparent slides according to the present invention.
FIG. 10 is a top view of the apparatus of FIG. 9.
FIG. 11 is a schematic block diagram of a sensor/printer assembly useful with the apparatus of FIGS. 9 and 10.
FIG. 12 is an illustration of an integrated sensing/printing assembly useful in the apparatuses of FIGS. 4, 8 and 9.
FIG. 13 is an illustration of another integrated sensing/printing assembly useful in the apparatuses of FIGS. 4, 8 and 9.
FIG. 14 is an illustration of a hybrid sensing/printing assembly useful with the apparatuses of FIGS. 4, 8 and 9.
FIG. 15 is an illustration of an apparatus permitting light incident on one surface of a sensing/printing assembly to be routed to another surface thereon.
FIG. 16 is an illustration of cross-connected sensing and printing elements that may be used to correct mirror-imaging between original and duplicate document pages.

DETAILED DESCRIPTION

Figure 7:
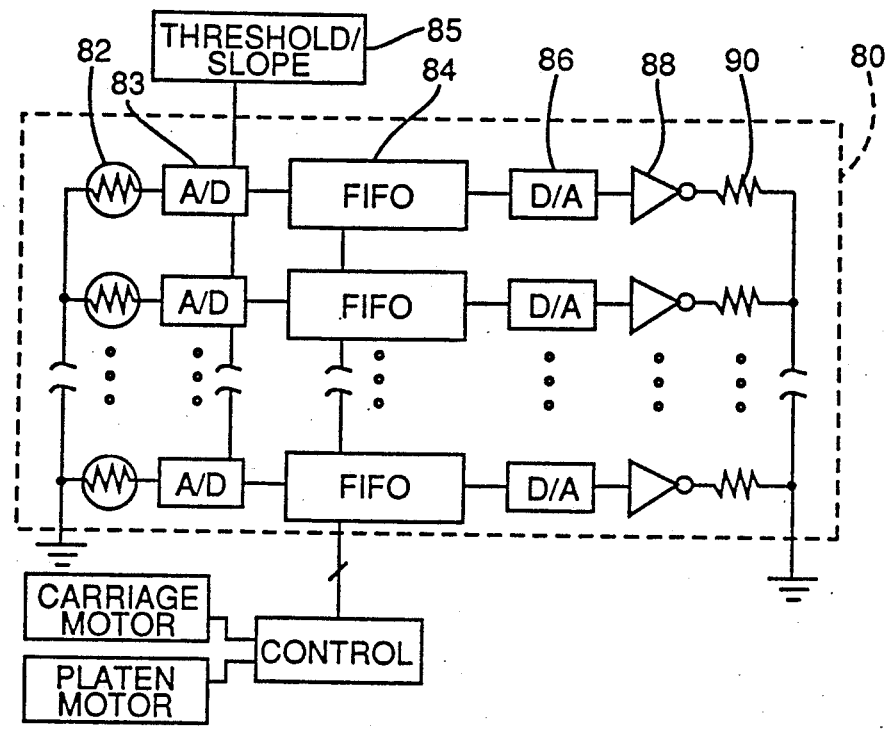
FIG. 7 is a schematic block diagram of a sensor/printer with memory useful with the apparatus of FIG. 4.

Referring to FIGS. 1-3, an exemplary black and white reproducing apparatus 20 according to a first embodiment of the present invention includes intercoupled sensing and printing heads 22, 24 which are scanned transversely across original and duplicate document pages 26, 28, respectively, by a common drive system 30 under the control of a control circuit 32. The drive system 30 comprises a band 34 looped around first and second pulleys 36, 38, thereby defining first and second linear band portions 40, 42. The first linear band portion 40 is adjacent the original document page 26 and has the sensing head 22 attached thereto. The second linear band portion 42 is adjacent the duplicate document page 28 and has the printing head 24 attached thereto. A reversible stepper motor 44 (such as a stepper motor or a linear motor with position sensing feedback) rotates the first pulley 36 and moves the looped band 34 and the heads 22, 24 along a passive support bar (not shown) on which the heads rest.

The sensing head 22 may be of conventional design and includes a linear array of photodetectors for sensing light reflected from the original document and producing electrical pixel data signals corresponding thereto. Suitable sensing heads are shown in U.S. Pat. Nos. 4,706,128, 4,683,501 and 4,266,250, the disclosures of which are incorporated herein by reference. In an exemplary sensing head, 25 photosensors are linearly arrayed over a distance of 0.166 inch in a direction perpendicular to the head's direction of movement. If output signals from the head are sampled every 6.66 mils of its travel, a sensing resolution of 150×150 dots (or pixels) per inch is achieved.

The printing head 24 may also be of conventional design and may comprise, for example, an ink jet head, a thermal transfer head, or an impact head. For purposes of illustration, the present invention is described with reference to an ink jet head, although the invention is not so limited. Suitable ink jet printing heads are shown in U.S. Pat. Nos. 4,500,895, 4,539,568 and 4,490,728, the disclosures of which are incorporated herein by reference. In the exemplary embodiment, 25 printing orifices are linearly arrayed over a distance of 0.166 inch in a direction perpendicular to the head's direction of movement. If these orifices are activated every 6.66 mils of the head's travel, a printing resolution of 150×150 dots per inch is achieved. (It will be recognized that higher print resolutions can be achieved if desired; the Hewlett Packard Desk Jet brand of ink jet printer, for example, achieves a resolution of 300×300 dots per inch.)

Interposed between the sensing head 22 and the printing head 24 is a coupling circuit 46 that receives the output data from the sensing head and generates driving signals corresponding thereto for application to the printing head. In simple embodiments, the output signals from the sensing head are in analog form and are periodically compared against a threshold value by the coupling circuit 46 as the head is moved across the page. If a given output signal from the sensing head 22 is determined to be above the threshold value (corresponding to a high degree of reflected light), the corresponding element of the printing array is not operated and a white pixel is preserved on the duplicate document page. If, on the other hand, the output signal from the sensing head is determined to be below the threshold value (corresponding to a low degree of reflected light), the corresponding element of the printing array is operated and a black pixel is produced on the duplicate document page.

In more sophisticated embodiments, the output signals from the sensing head are not simply compared against a single reference, but are instead compared against a plurality of references to generate a digitized gray scale output. In an exemplary system, each output signal is compared against eight thresholds, yielding an eight level gray scale that can be encoded in binary form into a three bit byte. In such embodiments, the coupling circuit 46 again converts these sense data into driving signals that yield corresponding gray scale print density on the duplicate document page when applied to the printing head. (Gray scale printing in ink jet systems is shown in U.S. Pat. Nos. 4,499,479, 4,494,128 and in U.S. patent application Ser. No. 07/285,836 filed Dec. 16, 1980, and assigned to the present assignee. Circuitry suitable for the conversion circuitry of coupling circuit 46 is within the purview of one of ordinary skill in the art, as illustrated by U.S. Pat. Nos. 4,106,061 and 4,706,128. These disclosures are incorporated herein by reference.)

If desired, the threshold value against which the output signal from the sensing head is compared can be made variable, as by provision of a threshold/slope control circuit 85 (FIG. 7). Such variability permits the user to adjust the threshold for optimum results regardless of illumination of the original document or its density. In the more sophisticated embodiments that employ multiple thresholds, the threshold/slope circuit 85 can set an initial threshold and the "slope" interval at which the other thresholds are spaced. In an exemplary embodiment, the initial threshold value may be set at 1 volt and the slope interval may be set at 0.1 volts, yielding values of 1.1, 1.2, 1.3, 1.4, 1.5, 1.6 and 1.7 for the other seven thresholds. (Logarithmic or other spacing of the thresholds can of course be used.)

Returning to the embodiment 20 shown in FIGS. 1–3, the original and duplicate document pages 26, 28 are mounted on drum platens 48, 50 that are advanced a line at a time (here 0.166 inches) by a common drive motor 52 under the control of control circuit 32. (The mechanical drive arrangements for the various platens used in this and the other embodiments of my invention are within the purview of those skilled in the art, as illustrated, inter alia, by U.S. Pat. Nos. 4,649,437 and 4,651,229, the disclosures of which are incorporated herein by reference.)

In operation, control circuit 32 first instructs motor 44 to position the sensing and printing heads 22, 24 at the left margins of their respective pages. The heads are then stepped from left to right across their respective pages in increments of 6.66 mils. At each step, the coupling circuit 46 is instructed by the control circuit 32 to sample the outputs of the photosensors in the sensing head and drive the printing elements in the printing head accordingly. When the heads have completed a linear scan across their respective pages, a 0.166 inch wide swath on the original document page has been copied onto the duplicate document page. The control circuit 32 then instructs the drum platens to both advance 0.166 inch and causes the motor 44 to begin stepping in the opposite direction, advancing the heads 22, 24 back across their respective pages, right to left. This raster scanning process continues until the original document page has been completely copied onto the duplicate document page.

In a related form 60 of the invention, shown in FIGS. 4–6, the discrete sensing and printing heads of the FIG. 1 embodiment are replaced by a single sensing/printing head assembly 62. This assembly, described more fully below, has an array of scanning elements on one side 64 thereof, an array of printing elements on a second side 66 opposite the first, and a memory 84 integral therewith. A drive assembly 68, again comprised of a looped band 69 driven by pulleys 70, 72 and a reversible motor 74, conveys the sensing/printing assembly 62 between the original and duplicate document pages 26, 28, with the sensing elements adjacent the original page and the printing elements adjacent the duplicate.

Unlike the FIG. 1 embodiment, the simplest version of the embodiment shown in FIGS. 4–6 desirably does not print as it senses, since this would result in the mirror-imaging of the original on the duplicate document page 28. Instead, a control circuit 76 causes the sensing and printing operations to be performed sequentially, with one pass between the documents being dedicated to sensing data from the original page and the return pass being dedicated to printing that data onto the duplicate page. To permit such operation, the assembly is provided (either externally or internally) with a FIFO memory 84 into which sense data from the sensing elements is written during one pass and from which the data is read and used to drive the printing elements during the return pass.

FIG. 7 shows a block schematic diagram of a sensing/printing assembly 80 that may be used for assembly 62 in FIGS. 4–6. Assembly 80 includes an array of photodetectors 82, a series of A/D converters 83 to convert the photodetector outputs into digital gray scale, and a FIFO memory 84 into which this gray scale data is written. (The FIFO memory 84 is here shown segregated into its logical partitions, one dedicated to each photodetector/printing element pair.) The assembly 80 additionally includes a series of D/A converters 86 driven from the memory 84 and a series of coupling circuits 88 for converting the analog signals to the proper form to drive the printing elements 90, as discussed above.

In operation of the embodiment 60 of FIG. 4, control circuit 76 first instructs the sensing/printing assembly 62 to scan from left to right across the original document page 26, generating sense data and writing this data to the FIFO memory 84. At the end of this pass, circuit 76 instructs the motor 74 to reverse direction and causes the printing element to print on the duplicate document page in accordance with the stored data. At the end of this second pass, the control circuit instructs the two platens 48, 50 on which the original and duplicate pages are mounted to both advance one line. The sequential sensing and printing passes then begin anew.

In FIG. 4 embodiment, with the sensing and printing arrays arranged to achieve 150 dot per inch resolution, a FIFO memory 84 having a total capacity of only 84,375 bits can contain the full swath of data generated by the 25 sensing elements (assuming a swath length of 7.5 inches across the page). This figure represents a considerable savings in memory over competing reproducing systems that require a full page be sensed and stored prior to reproduction.

In a variation of the FIG. 4 embodiment, the sensing and printing elements can both be operated during each pass of the sensing/printing head between the original and duplicate document pages. In such variant embodiment, the first pass is again dedicated solely to sensing data from the original document page and storing this data in memory. On the return pass, however, the original page is advanced one line and additional data is sensed from it. Bytes of this new data overwrite corresponding data bytes from the prior line just as soon as that prior data is read and provided to the printing elements for application to the duplicate page. At the end of the return pass, both documents are advanced a line, and the sensing of a new line from the original document page and printing of the prior line onto the duplicate document page is repeated. These simultaneous sensing/printing operations continue until there is no more data to sense from the original document, at which time the sensing/printing head makes one last pass between the documents to print the last line from the original document onto the duplicate document page.

Figure 17:
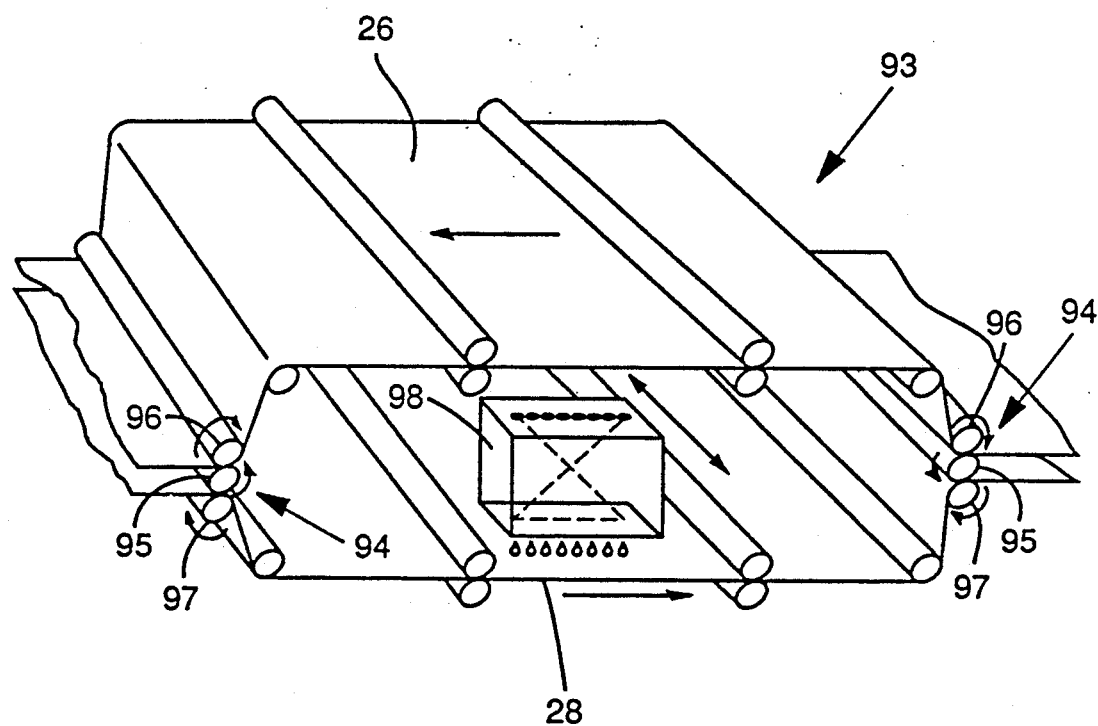
FIG. 17 is an illustration of a drive arrangement that advances original and duplicate document pages in opposite directions relative to the cross-coupled reproducing head of FIG. 16.

In an alternative embodiment of the present invention, the mirror-imaging problem that necessitated the use of a memory in the FIG. 4 embodiment can instead by solved by cross-coupling the sensing and printing elements (as shown in FIGS. 16 and 17) and advancing the original and duplicate document pages in opposite directions. The left for right reversal that results by sensing and printing simultaneously from different sides of a single head is then corrected by the additional 180 degree reversal of the duplicate page with respect to the original and yields a true copy without the use of an intermediate memory.

FIG. 17 shows a simple mechanical apparatus 93 for advancing the original and duplicate document pages 26, 28 in opposite directions. The apparatus includes two drive assemblies 94 each comprised of a driver roller 95 and two idler rollers 96, 97. The original page 26 is advanced in one direction (to the left in the figure) between rollers 95 and 96. The duplicate page 28 is advanced in the opposite direction (to the right in the figure) between rollers 95 and 97. A reproducing head 98 with cross-coupled sensing and printing elements positioned on opposite sides thereof is mounted between the original and duplicate pages for transverse motion thereacross. During each pass between the pages, the reproducing head 98 senses a swath of imagery from the original and simultaneously prints it in inverted form on the duplicate. The pages then advance in opposite directions and the process repeats until the image on the original document page has been completely reproduced on the duplicate document page.

Figure 8:
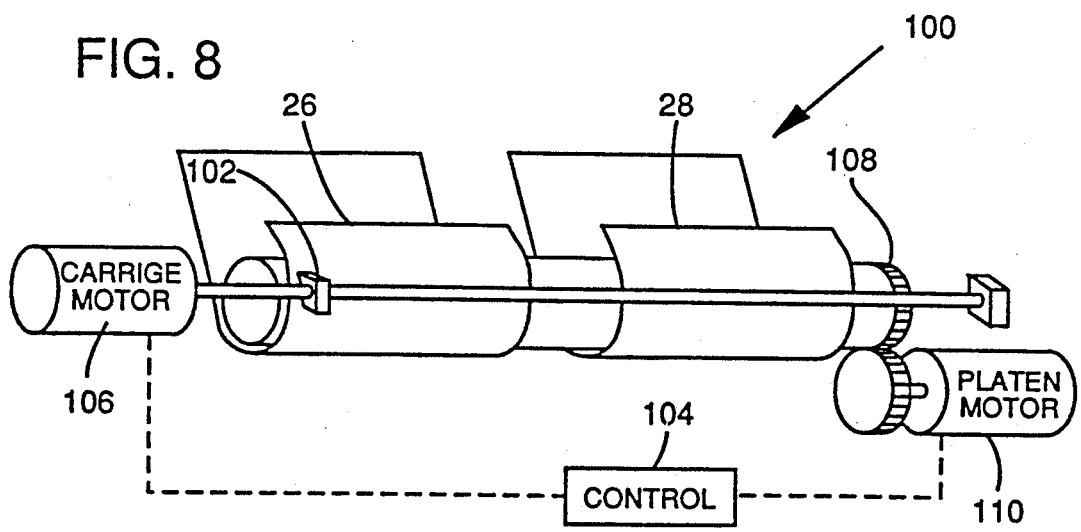
FIG. 8 is an illustration of another reproducing apparatus according to the present invention.

Still another reproducing apparatus 100 according to the present invention is shown in FIG. 8. In this embodiment, the original and duplicate document pages 26, 28 are positioned adjacent one another and are scanned by a combined sensing/printing head 102. Unlike the FIG. 4 embodiment, however, the sensing/printing head 102 of FIG. 8 is arranged with its sensing and printing elements on the same side thereof. It is otherwise similar to the head shown in block diagram form in FIG. 7.

In operation, a control circuit 104 instructs a carriage motor 106 to move the sensing/printing head 102 across the original document page 26 and scan a band of image data into the FIFO memory 84. After completing its pass over the original document page, the control circuit 104 causes the sensing/printing head 102 to switch modes and begin printing in accordance with the stored data as it continues its linear travel, now over the duplicate document page 28. At the end of the linear scan, the head 102 is returned to its initial position and the platen 108 is advanced one line by a platen drive motor 110. The process then repeats, sequentially sensing and printing swaths across the pages until the entire original has been copied onto to the duplicate document page.

A final reproducing apparatus 120 according to the present invention, this one designed principally for converting images from transparent media (such as slides) into hard copy form, is shown in FIG. 9.

In this embodiment, a combined sensing/printing head 122 (with the sensing and printing elements on opposite sides thereof), is positioned in the focal plane of an optical projector 124 and is scanned in raster-scan fashion therethrough. The sensing elements on the head are oriented towards the projector to receive light projected therefrom. Adjacent the printing elements on the opposite surface of the head 122 is the duplicate document page 28 onto which the slide image is to be printed.

Movement of the head 122 through the focal plane of the optical projector 124 is accomplished by an X-Y drive assembly 126 shown best in FIG. 10. This drive assembly includes a conventional printer carriage 128 that moves the head 122 back and forth in the X direction under the control of a reversible stepper motor 130. Carriage 128, in turn, is controllably moved in its entirety in the Y direction by drive screws 132, 134 that are turned by tandem-operated reversible stepper motors 136, 138. Each of motors 130, 136 and 138 is controlled by a control circuit 140 that sequences their operations to effect the desired raster scan.

In normal operation, the reproducing apparatus 120 of FIG. 9 operates to print a dark pixel on the duplicate document page 28 when the corresponding sensing element senses a dark pixel in the projected image. In this manner, a true image is reproduced. However, it is also sometimes desireable to invert the sensed gray scale so that the image projected from a transparent negative can be printed in positive form (or vice versa). Accordingly, the sensing/printing head 122 used in the FIG. 9 embodiment may be of the form shown in FIG. 11, which permits the controllable reversal of the gray scale. As shown, this head 122 includes arrays of photosensors 142 and A/D converters 144 as in the earlier-described heads. However, instead of driving the coupling circuit 146 directly, the head 122 interposes a processing stage 148 that can selectively reverse the gray scale, depending on the position of a switch 150. When the switch is in the "positive" position, no gray scale inversion takes place—the head operates similarly to the above-described head. However, when the switch is in the "negative" position, the data processor digitally subtracts the digitized gray scale value output by A/D converter 144 from the maximum possible gray scale value. In the above-mentioned three bit gray scale system, the maximum gray scale value is 7, so a 0 input to the processor 148 yields a 7 output after processing, a 1 input yields a 6 output, and so on. By this arrangement, a hard copy positive can readily be produced from a transparent negative.

Sensing/printing heads suitable for use in the above-described embodiments are illustrated in FIGS. 12-14. In FIGS. 12 and 13, the heads are fabricated in monolithic, or integrated circuit form on a substrate 160 of a semiconductor material, such as silicon. Fabricated on this substrate are photosensing elements 162, ink jet firing resistors 164, and intercoupling circuitry 166 of the type described above in connection with FIGS. 7 and 11. (For convenience of illustration, FIGS. 12-14 show only one of each of these elements, it being understood that they are replicated on the common substrate as many times as there are photosensor/printing element pairs. Furthermore, the intercoupling circuitry 166 is shown as a single rectangle although it contains many distinguishable elements, such as A/D converters, FIFO memories, driving circuitry, etc.)

Constructed on the substrate 160 are one or more ink chambers 168 from which ink is controllably ejected by operation of the firing resistors 164. In the illustrated embodiments, these chambers are formed by a series of photolithographic steps wherein a photodefinable material, such as photoresist or Vacrel (a photodefinable polymer film), is applied to the substrate, exposed in accordance with the desired resulting geometry, and selectively removed. (In some construction techniques, it may be necessary to apply a top plate on the photodefined material to serve as the top wall of the chambers.) To minimize crosstalk between the orifices, it is desirable that each orifice be provided with its own firing chamber, which is then coupled to a central ink supply through openings 170. In simpler embodiments, all of the orifices can be operated in a single, large chamber.

In the FIG. 12 embodiment 180, the ink jet orifice 182 is formed in the photodefinable material and is positioned opposite the firing resistor 164. This head thus operates to sense and print from the same side thereof. In the FIG. 13 embodiment 190, in contrast, the ink jet orifice 182 is formed in the silicon substrate 160 and thus ejects ink from the surface opposite the photosensors. In such embodiment, the firing resistor is fabricated symmetrically around the orifice itself instead of on the opposing surface of the chamber.

FIG. 14 shows another sensing/printing head 200, this one using hybrid construction rather than the integrated circuit construction used in FIGS. 12 and 13. Hybrid head 200 includes a ceramic substrate 202 in which a printing orifice 204 is formed. Fabricated on substrate 202 around orifice 204 is a thin film firing resistor 206. Thin film conductors 208 are also patterned on the substrate and serve to interconnect circuitry mounted thereto. This circuitry here comprises a semiconductor circuit 210 that includes a photosensor element and the associated converter, memory and other circuitry required to drive the firing resistor 206 (i.e. a combination of elements 162 and 166 from FIGS. 12 and 13). Connections between the top surface of the semiconductor circuit 210 and the thin film traces 208 are made by small wire bonds. As in the FIGS. 12 and 13 embodiments, the firing chamber 212 is again formed by a photodefinable material 214.

FIG. 15 shows an accessory 220 that directs light from one surface of a sensing/printing head 222 to the opposite surface thereof. Such an accessory can be used, for example, to permit the head of FIG. 13 to sense and print from the same side. Accessory 220 simply comprises a light guide defined by light tunnels 224, 226 and mirrors 228, 230 arranged to receive light incident on one side of the head and direct it towards the opposite side of the head.

While the foregoing embodiments have all been illustrated and described as using "naked" photosensors (i.e. without any associated lensing optics or light tunnels), in alternative embodiments such features can be provided, either on a per-photosensor basis, or using a single lens/light tunnel in conjunction with all the photosensors in an array. If magnifying lenses are used, higher imaging resolutions can be achieved with a given photosensor spacing. Similarly, while the foregoing embodiments have been illustrated and described as relying on ambient light for illumination of the original document page, it will be recognized that an additional source of illumination, integral with the sensing/printing head, can be provided if necessary. This illumination source can be quite modest in size and light output, since it need illuminate only a tiny fraction of the document being sensed.

Having described and illustrated the principles of my invention with reference to several embodiments and variations thereon, it will be apparent that the invention can be modified in arrangement and detail without departing from such principles. For example, while the illustrated combined sensing/printing heads have been described as being of unitary construction, such heads may alternatively be formed simply by retrofitting existing ink jet printheads with accessory sensing arrays. Similarly, while the embodiments of FIGS. 1, 4 and 8 are illustrated as using drum platens, the invention can alternatively be practiced using flat platens. The FIG. 9 embodiment, which is illustrated as using a flat platen for the duplicate document page, can alternatively be adapted for use with a drum platen.

In still other embodiments, the spacing between the sensing elements can be made smaller or larger than the spacing between the corresponding printing elements to effect a magnification or reduction in the reproduction process, respectively. Finally, while the invention has been described with reference to monochromatic sensing and printing, the principles thereof can readily be used in color systems in which the photosensors and printing elements are replicated several times, once for each of the component ink colors. One such system uses a single, multi-color sensing array and a plurality of different single-color printing arrays. These printing arrays are conveyed on separate carriages spaced along the length of the paper and are driven with data streams from the single sensor that are delayed in accordance with their spacing. Other such systems use a plurality of separate sensor/printer arrangements (such as are illustrated in FIG. 1, 4 and 8)—one for each color. In either type of system, the spacing of the ink jet carriages permits each ink an adequate dry time before droplets of other colors are superimposed nearby. An apparatus like that shown in FIGS. 9 and 10 for producing color hardcopy duplicates corresponding to color slides can similarly be realized.

In view of these and the wide variety of other embodiments to which the principles of my invention can be applied, it should be recognized that the illustrated embodiments are to be considered exemplary only and not as limiting the scope of my invention. Instead, I claim as my invention all such modifications as may come within the scope and spirit of the following claims and equivalents thereto.

I claim:

1. A reproducing apparatus, comprising a semiconductor substrate;
   a photodetector fabricated on the substrate;
   an ink droplet ejector including:
      a heating element fabricated on the substrate; and
      means defining an ink chamber containing the heating element, the chamber including an orifice through which ink in the chamber can be ejected upon the heating of the heating element by electrical firing signals; and
   processing means coupled to the detector for processing and storing output signals produced by the photodetector and for providing to the heating element electrical firing signals corresponding to the stored output signals, the processor means including:
      a semiconductor read/write memory fabricated the substrate;
      means for writing data corresponding to output signals of the photodetector into the memory; and
      means for reading the data from the memory and for providing electrical firing signals corresponding thereto to the heating element.

2. The apparatus of claim 1 in which the orifice is defined in the substrate.

3. The reproducing apparatus of claim 2 in which the means defining the ink chamber comprises a photodefinable material.

4. The reproducing apparatus of claim 1 in which the means defining the ink chamber comprises a photodefinable material and the orifice is defined in said material.

5. A reproducing apparatus, comprising:
   a substrate defining an orifice;
   a thin film firing resistor formed on the substrate adjacent the orifice;
   semiconductor means attached to the substrate and including:
      a photodetector for sensing radiant energy and producing an output signal corresponding thereto;
      means coupled to the photodetector for processing the output signals produced thereby and for providing an electrical firing signal corresponding thereto to the resistor;
   the apparatus further including means defining an ink chamber vented by the orifice and including the resistor therein; and
   scanning means for moving the substrate relative to a band of image data.

6. A reproducing apparatus, comprising:
   a substrate defining an orifice;
   a thin film firing resistor formed on the substrate adjacent the orifice;
   semiconductor means attached to the substrate and including:
      a photodetector for sensing radiant energy and producing an output signal corresponding thereto;
      means coupled to the photodetector for processing the output signals produced thereby and for providing an electrical firing signal corresponding thereto to the resistor;
   a semiconductor read/write memory attached to the substrate;
   means for writing data corresponding to an output signal of the photodetector into the memory;
   means for reading the data from the memory and for providing electrical firing signals corresponding thereto to the resistor; and
   the apparatus further including means defining an ink chamber vented by the orifice and including the resistor therein.

* * * * *